United States Patent [19]

Zaromb

[11] 4,190,703

[45] Feb. 26, 1980

[54] FLUIDIZED-BED ELECTRODES AND RELATED APPARATUS AND METHODS

[76] Inventor: Solomon Zaromb, 171 Clifton Ave., Newark, N.J. 07104

[21] Appl. No.: 856,731

[22] Filed: Dec. 1, 1977

Related U.S. Application Data

[63] Continuation-in-part of Ser. No. 813,483, Jul. 7, 1977, abandoned.

[51] Int. Cl.² ............................................. H01M 8/04
[52] U.S. Cl. ........................................ 429/15; 429/27; 429/34
[58] Field of Search ..................... 429/13, 14, 15, 27, 429/34

[56] References Cited

U.S. PATENT DOCUMENTS

| | | | |
|---|---|---|---|
| 3,767,466 | 10/1973 | McCoy et al. | 429/27 |
| 3,840,405 | 10/1974 | d'Orsay | 429/34 X |
| 3,879,225 | 4/1975 | Backhurst et al. | 429/15 |
| 3,981,747 | 9/1976 | Doniat et al. | 429/15 |

*Primary Examiner*—Anthony Skapars

*Attorney, Agent, or Firm*—Solomon Zaromb

[57] ABSTRACT

The current-carrying capacity of a fluidized-bed electrode is enhanced by imparting increased velocities to the particles suspended therein while maintaining a relatively low degree of bed expansion or voidage. This is accomplished in one embodiment of the invention by means of pairs of opposing jets of electrolyte impinging against each other so as to effect a highly turbulent motion of the fluidized particles while the net flow velocity of the supporting electrolyte is kept relatively low. In a second preferred embodiment, the electrolyte flow velocity may be as high as desired, but its direction, preferably horizontal, is reversed at frequent intervals. The suspended particles get thereby intermittently packed against and retained by filters at the alternating outlet walls. The alternating packing and expansion result in improved charge and mass transport, and hence in improved electrode performance.

The above improvement is especially applicable to fluidized beds of activated carbon particles and of other materials whose specific gravity is not much higher than that of the supporting electrolyte.

10 Claims, 4 Drawing Figures

FLUIDIZED-BED ELECTRODES AND RELATED APPARATUS AND METHODS

This is a continuation-in-part of my co-pending applicaion Ser. No. 813,483, filed July 7, 1977, now abandoned which is incorporated herein by reference. In said application, I have disclosed improved air-depolarized fluidized-bed electrodes for use in various types of electrochemical processes and apparatus, especially in power sources.

BACKGROUND OF THE INVENTION

This invention relates to improved fluidized-bed electrodes, especially air-depolarized cathodes, and to related apparatus and methods.

One serious limitation of the fluidized-bed electrodes disclosed heretofore is that the upward flow of the supporting electrolyte through the bed can not exceed a certain optimum value beyond which the current-carrying capacity of the electrode decreases. This optimum flow corresponds to rather low bed expansions, usually about 10% or less. Higher bed expansions result in reduced interparticle contacts, and hence in reduced charge transfer. To maintain the expansion sufficiently low and yet permit the electrolyte flow rate to be sufficiently high for adequate mass transport, the specific gravity of the fluidized particles should preferably exceed that of the supporting electrolyte by at least 2 $gm/cm^3$. This limitation would preclude the use of activated carbon and of other relatively light materials in fluidized-bed electrodes. Yet activated carbon has several most desirable features, including a high active surface area per unit weight, a high catalytic activity, and low cost, which make it an especially outstanding candidate material for the fluidized particles in air cathodes.

It is an object of my invention to overcome the afore-outlined limitations of present fluidized-bed electrodes, and thereby increase their current-carrying capacity. It is also an object of my invention to permit the use of activated carbon as the chief component of the fluidized particles in fluidized-bed electrodes, especially air-depolarized cathodes.

SUMMARY OF THE INVENTION

Briefly, my invention consists of imparting the desired high velocities to the particles suspended in the fluidized-bed electrode while maintaining the bed expansion or voidage optimally low. One way of achieving this is by causing opposing horizontal high-velocity inlet jets to impinge against each other, thereby causing their kinetic energy to be dissipated into turbulent motions while the net vertical flow velocity of the supporting electrolyte is kept relatively low. An alternative way is to use a high unidirectional flow at any given time, but to reverse the flow direction at frequent intervals. In the latter case, the alternating inlets and outlets may extend over most of the length of the bed, so as to impart a substantially uniform average particle motion throughout the bed, and should comprise suitable filters to retain the fluidized particles within the electrode compartment. The rapid alternating flow causes intermittent partial packing of particles against the alternating outlets, and a rapid to and fro motion of the particles between the inlet and outlet sides. This yields frequent interparticle contacts and hence a high rate of mass and charge transfer.

Since the particle velocities and interparticle contacts imparted by either of these types of flow do not determine the vertical bed expansion or the overall bed voidage, it thereby becomes practical to use activated carbon and other relatively light materials as fluidized electrode catalysts. The high area/weight ratio of activated carbon is especially useful for effecting adequate mass transport of oxygen in the fluidized-bed air cathode systems disclosed in my afore-cited co-pending application.

BRIEF DESCRIPTION OF THE DRAWING

My invention may best be understood with the aid of the drawing, in which.

DESCRIPTION OF THE PREFERRED EMBODIMENTS

Figure 1:
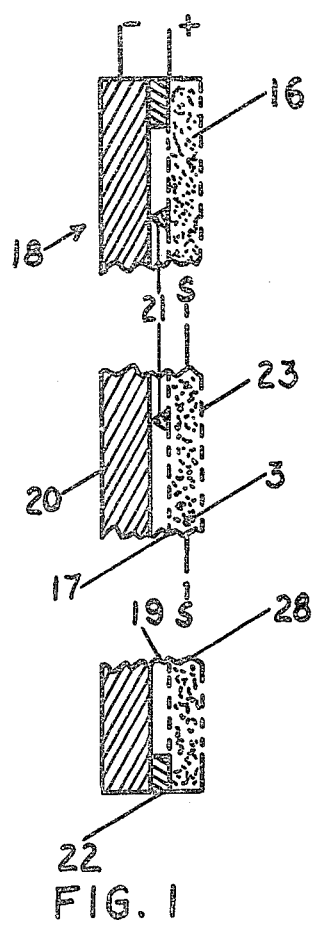
FIG. 1 is a partial schematic magnified cross-sectional view of an electrochemical cell comprising a fluidized-bed electrode.

In FIG. 1 is shown an electrochemical cell 18 similar to those described in my afore-cited co-pending application. A single compartment 28 comprises particles 3, preferably of activated carbon, in a flowing electrolyte 16 contained between an outer air-permeable electrolyte-impermeable membrane 23 and an inner current-collecting grid 17. Near membrane 23, the surfaces of particles 3 become enriched with oxygen permeating through said membrane. This oxygen is electro-reduced as the particles approach grid 17.

Electrolyte gap 19, counter-electrode 20, insulating spacers 21, and end gaskets 22 substantially complete the electrochemical cell. As in my afore-cited co-pending application, electrode 20 may be an anode consuming a hydrogen-rich fuel, a consumable metal anode forming part of a metal-air power source, or, in conjunction with a suitable diaphragm (not shown), an anode for the electro-oxidation of chloride ions in the manufacture of chlorine.

Figure 2:
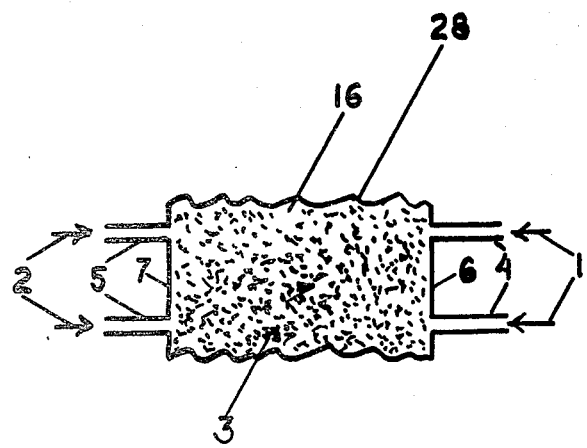
FIG. 2 is a partial schematic view of section S—S of FIG. 1 according to one embodiment of my invention.

According to one embodiment of my invention, the view of section S—S of FIG. 1, perpendicular thereto, would appear as indicated in FIG. 2. Jets of electrolyte, entering through pairs of opposite entrance nozzles 4 and 5 (situated at the end walls 6 and 7 of compartment 28) along the directions indicated by the horizontal arrows 1, 2, impinge against each other, and their kinetic energy is thereby dissipated into a swirling motion, of which only a minor component contributes to an upward flow. The bed expansion and voidage can therefore be kept at an optimal low value while the fluidized particles maintain the rapid motions required for high rates of mass and charge transfer.

Figure 3:
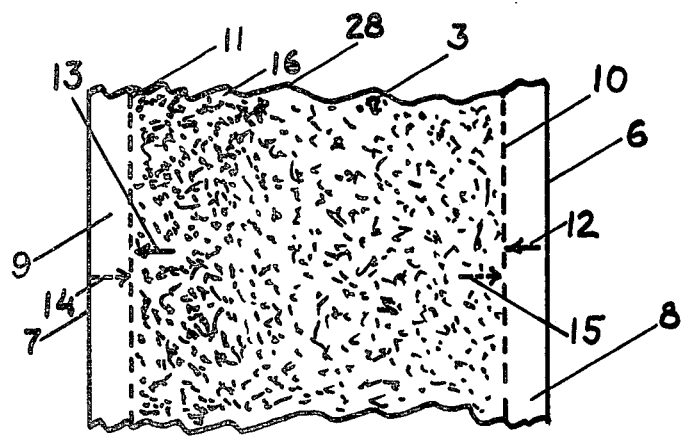
FIG. 3 is a partial schematic view of section S—S of FIG. 1 according to an alternative embodiment of my invention.

According to an alternative embodiment of my invention, the view of section S—S of FIG. 1, perpendicular thereto, would appear as indicated in FIG. 3. Here the end walls 6 and 7 of compartment 28 comprise vertical electrolyte channels 8 and 9 separated from compartment 28 by filters 10 and 11. The latter also serve as flow distributors. During the first portion of a cycle, the electrolyte flows from channel 8 through filter 10 into compartment 28, and thence through filter 11 into channel 9, as indicated by arrows 12, 13. In the second portion of the cycle, the flow is reversed, as indicated by the arrows 14, 15.

Although the flow directions 12, 13 and 14, 15 are horizontal in FIG. 3, it is also possible to use a configuration in which the entire FIG. 3 is turned around by 90° so as to yield an approximately vertical reciprocating upward and downward flow.

Figure 4:
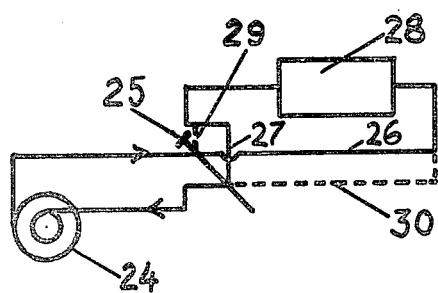
FIG. 4 is a schematic diagram of a pump-and-valve system controlling the flow directions of FIG. 3.

The reversal of flow directions may be effected by a special reciprocating pump (not shown) or by a unidirectional pump 24 acting in conjunction with an electronically programmed solenoid valve 25, as shown in FIG. 4. In the first portion of a cycle, valve 25 keeps the solid lines 26 and 27 open and the dotted lines 29 and 30 closed, thereby causing the flow through compartment 28 to be from right to left. In the second portion of the cycle, the links 26 and 27 are shut while lines 29 and 30 are opened, whereby the flow through compartment 28 is reversed.

Although the embodiments described herein are concerned primarily with fluidized air-depolarized cathodes, the improvements disclosed herein are obviously applicable to numerous other types of electrochemical reactors utilizing fluidized-bed electrodes, as is well known in the art.

There will now be obvious to those skilled in the art many modifications and variations of the above-disclosed embodiments, which, however, will fall within the scope of my invention if defined by the following claims:

I claim:

1. Apparatus comprising a fluidized-bed electrode, and pairs of opposing jets of fluid impinging against each other and thereby imparting swirling motions to the particles of the fluidized bed.

2. Apparatus comprising a fluidized-bed electrode, and a reciprocating flow system causing electrolyte to flow through said electrode in a to-and-fro motion with reversals in the direction of electrolyte flow occurring at frequent intervals in repeating cycles.

3. Apparatus of claim 2 wherein said fluidized particles comprise activated carbon.

4. Apparatus as claimed in claim 2, wherein said fluidized-bed electrode is an air-depolarized cathode.

5. Apparatus as claimed in claim 4, wherein said air-depolarized cathode comprises an oxygen-permeable electrolyte-impermeable membrane.

6. A method of increasing the current-carrying capacity of a fluidized-bed electrode which comprises increasing the kinetic energy of the fluidized particles in said electrode by causing opposing jets of fluid to impinge against each other so as to impart swirling motions to the particles of the fluidized bed.

7. A method of increasing the current-carrying capacity of a fluidized-bed electrode which comprises increasing the kinetic energy of the fluidized particles in said electrode by effecting a reciprocating flow of electrolyte through said electrode, with the direction of said flow reversing at frequent intervals in repeating cycles.

8. The method of claim 7 wherein said fluidized particles comprise activated carbon.

9. The method of claim 7 wherein said electrode is an air-depolarized cathode.

10. The method of claim 9 wherein said cathode comprises an oxygen-permeable electrolyte-impermeable membrane.

* * * * *